United States Patent
Jachmann et al.

(10) Patent No.: US 11,768,474 B2
(45) Date of Patent: Sep. 26, 2023

(54) OPTOELECTRONIC SAFETY DEVICE

(71) Applicant: SICK AG, Waldkirch (DE)

(72) Inventors: Fabian Jachmann, Waldkirch (DE); Andreas Schieber, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/675,123

(22) Filed: Feb. 18, 2022

(65) Prior Publication Data
US 2022/0269237 A1 Aug. 25, 2022

(30) Foreign Application Priority Data
Feb. 19, 2021 (DE) .......... 102021103952.5

(51) Int. Cl.
*G05B 19/04* (2006.01)
*G05B 19/042* (2006.01)

(52) U.S. Cl.
CPC ...... *G05B 19/0428* (2013.01); *G05B 2219/24024* (2013.01)

(58) Field of Classification Search
CPC ........... G05B 19/0421; G05B 19/0426; G05B 19/0428; G05B 2219/24024
See application file for complete search history.

(56) References Cited

U.S. PATENT DOCUMENTS

2007/0294601 A1 12/2007 Chitsaz et al.

FOREIGN PATENT DOCUMENTS

| DE | 102015101023 A1 | 7/2016 | |
|---|---|---|---|
| DE | 102019211770 B3 | 9/2020 | |
| EP | 0605496 B1 | 7/1994 | |
| EP | 3588365 A1 * | 1/2020 | ............... G01V 8/10 |
| WO | 2018125438 A2 | 7/2018 | |
| WO | 2018125438 A3 | 7/2018 | |

OTHER PUBLICATIONS

I. Majzik et al., Multiprocessor Checking Using Watchdog Processors, International Journal of Computer Systems Science & Engineering, Jan. 2002.

* cited by examiner

*Primary Examiner* — Kevin K Pyo
(74) *Attorney, Agent, or Firm* — Nath, Goldberg & Meyer; Jerald L. Meyer

(57) ABSTRACT

The invention relates to an optoelectronic safety device with a light transmitter (14), a light receiver (30) for receiving received light beams (26) from reflections on at least one object (24) in the monitored region (22), an evaluation unit (32) for evaluating the received signals and for outputting a safety signal as a function of the received signals, the evaluation unit (32) comprising a standard multicore processor which is formed on only one semiconductor substrate and has at least two CPUs (44, 46), the standard multi-core processor (42) not being a dedicated safety module and the evaluation being carried out redundantly on both CPUs (44 and 46) of the computing unit (42), and the evaluation unit (32) having a watchdog controller (50) which monitors the function of the computing unit (42), the watchdog controller (50) being able to cause the evaluation unit (32) to output the safety signal independently of the computing unit (42).

10 Claims, 1 Drawing Sheet

OPTOELECTRONIC SAFETY DEVICE

Figure 1:
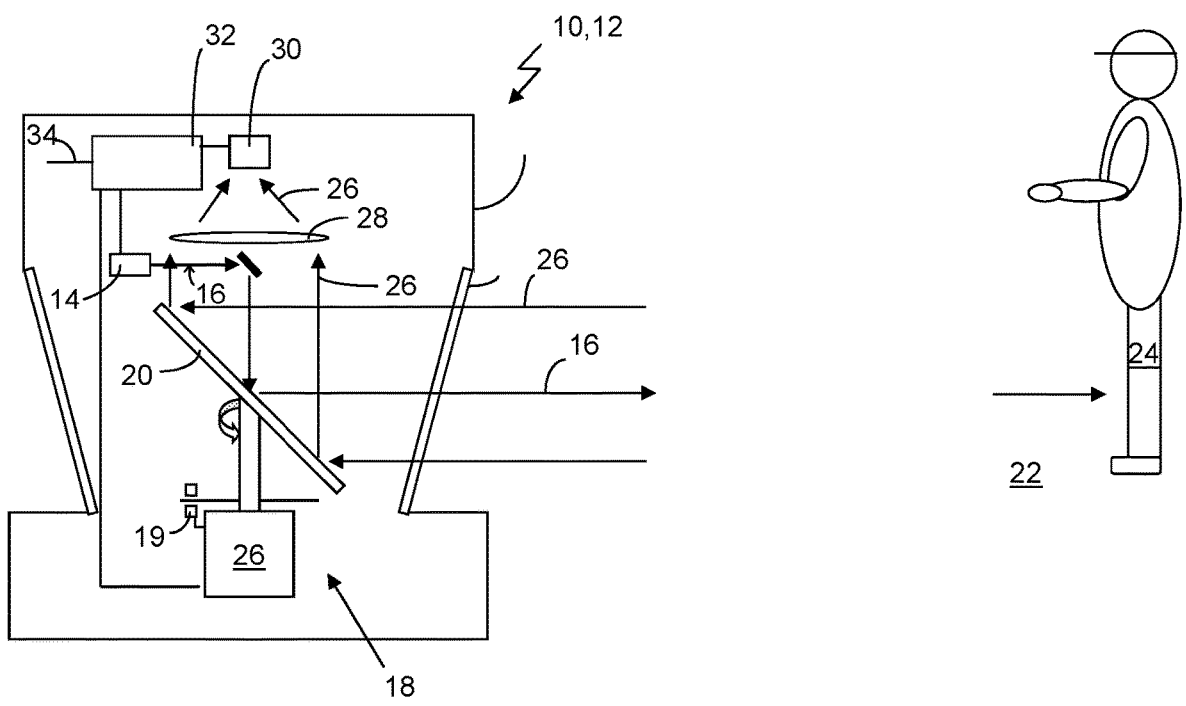

The invention relates to an optoelectronic safety device for monitoring a monitored area, having a light transmitter, a light receiver and an evaluation unit for evaluating the received signals and outputting a safety signal as a function thereof.

The essential problem with which the present invention is mainly concerned relates to the functional safety of optoelectronic safety devices. Sensors used in safety technology, such as safety laser scanners, must work particularly reliably and therefore fulfil high safety requirements, for example the standards IEC 61508 or EN 62061 for safety-related systems and the EN61496 device standard for electro-sensitive protective equipment (ESPE). These standards provide architectural specifications to be applied for different safety integrity levels (SIL).

The required safety levels can be achieved by a number of measures, such as safe electronic evaluation by redundant, diverse electronics, function monitoring and/or special monitoring of the contamination of optical components and/or provision of individual test targets with defined degrees of reflection that must be detected at corresponding scan angles. A single error can be detected in a simple system by periodic self-tests. If, for example, a reference target installed in the housing of an optoelectronic safety device is not detected or is detected incorrectly, it can be concluded that the sensor unit of this device is no longer working correctly. Within a certain time, a safety-critical condition can therefore be detected and the device can be switched off in a safety-oriented manner.

More complex units of the optoelectronic safety device can partly not be tested fast enough in the system. This applies especially to signal processing at the processor level. Here it is common to carry out the processing in two channels and compare them. If one processor detects a deviation from the result in the other processor, this leads to a safety-related shutdown. Each processor has a redundant channel available for switching off.

The complete self-testing of such a system often requires more computing power than the actual safety function. The complete two-channel design of the processor unit with redundant computing units and separate memory increases the installation space, costs and waste heat of the device. In particular, coupling a single-channel sensor front-end into a dual-channel processor back-end can be problematic. There are dedicated lockstep-dual-core processors optimised for safety applications. These processors exclude common cause errors on a chip. However, these chips are not available in high performance classes. In addition, they do not currently offer the integration of programmable logic (FPGA) or sufficient variability in interfaces or additional modules (e.g. ADCs).

So, since safety measures always mean a lot of extra effort and cost, the effort is to make safety measures as simple and efficient as possible, but still effective and sufficient.

A safety light grid is known from EP 0 81605496, in which a system processor is checked via a watchdog controller to ensure safe operation.

A safety switching device is known from DE 102015101023 A1, in which a first signal processing channel is arranged on a first semiconductor substrate and a second signal processing channel is arranged on a second semiconductor substrate, the two semiconductor substrates being monolithically assembled to form a stack and thus a one-piece electronic component. This is a new type of component which is designed as a dedicated safety component especially for the safety application and in its composition forms only a single component, but the individual layers of the stack are separate semiconductor substrates for the signal processing channels to be strictly separated.

Based on this state of the art, it is the object of the invention to provide an optoelectronic safety device with which the drawbacks mentioned can be avoided, in which in particular the effort and the costs for the safety measures are reduced without losing the safety level.

This object is solved by a an optoelectronic safety device having
- a light transmitter for emitting transmitted light beams into a monitored area,
- a light receiver for generating reception signals from received reception light beams which originate from reflections of the transmitted light beams on at least one object in the monitored area,
- an evaluation unit for evaluating the received signals and for outputting a safety signal depending on the received signals,
- wherein the evaluation unit has a computing unit with at least two CPUs, wherein the computing unit is not a dedicated safety module and is designed as a standard multi-core processor based on only one single semiconductor substrate, this standard multi-core processor does not in itself fulfil any safety standard and is commercially available as standard and the evaluation of the signals takes place redundantly on both CPUs of the computing unit,
- and the evaluation unit has a watchdog controller which monitors the function of the computing unit, wherein the watchdog controller can cause the evaluation unit to output the safety signal independently of the computing unit.

Well-known standard multi-core processors are available as low-cost integrated devices that combine all components to control and evaluate a complex optoelectronic safety device. The standard multi-core processor is not in itself a dedicated safety device. In principle, several, in particular two, identical processors would be available for evaluation in order to perform a two-channel signal evaluation and thus at least increase functional safety. However, both processors use certain parts of the system in common, so that already one error can lead to a safety-critical failure of the system. The challenge of the present invention, i.e. the use of a standard multi-core processor for an optical safety device, is to identify and diagnose possible errors both of common cause affecting both processors and in the commonly used parts of the standard multi-core processor at runtime. According to the invention, this is done by a watchdog controller which has the ability to switch the safety output independently of the standard multi-core processor. By monitoring the standard multi-core processor and the independent possibility to switch the safety output, the functional safety can be ensured by means of the watchdog controller. At the same time, such a watchdog controller must fulfil far fewer requirements than an otherwise necessary second processor channel. Accordingly, costs and energy consumption remain at an extremely low level. Costs can be saved and waste heat can be reduced.

Further integration and thus cost savings and waste heat reduction can be achieved if the computing unit is designed as part of a SoC (system-on-chip).

In a simple way, the watchdog controller can be provided externally to the SoC.

Advantageously, the watchdog controller forms a second logical shutdown channel with one of the CPUs of the computing unit. The watchdog controller thus has two functions, namely to monitor the function of the computing unit on the one hand and to form a quasi-diverse shutdown channel together with one of the CPUs on the other.

In a further embodiment of the invention, the watchdog controller performs various tests to check the CPUs, these tests can include
   a clock frequency comparison,
   an activity test,
   generating tasks for a CPU and checking the corresponding task results or
   the monitoring of voltages.

In further embodiment of the invention, the watchdog controller communicates alternately with one CPU of the computing unit at a time via a serial interface. In this way, for example, the above-mentioned two evaluation channels can be formed.

In a further embodiment of the invention, it is also possible for the processor to contain further computing cores, for example to increase the computing power. This could be useful when using the invention in 3D cameras.

To increase safety, it may be provided that a monitoring device is provided which causes the standard multi-core processor to continuously perform self-tests on individual functions.

With particular advantage, the invention is used in safety laser scanners, FMCW radar, FMCW lidar, 3D-ToF safety camera or in safety sensors based on sensor data fusion. These devices are electronically very complex with elaborate data processing and therefore require large computing power, so that it is advantageous if the effort to achieve functional safety remains as simple as possible as provided by the inventive subject matter.

Figure 2:
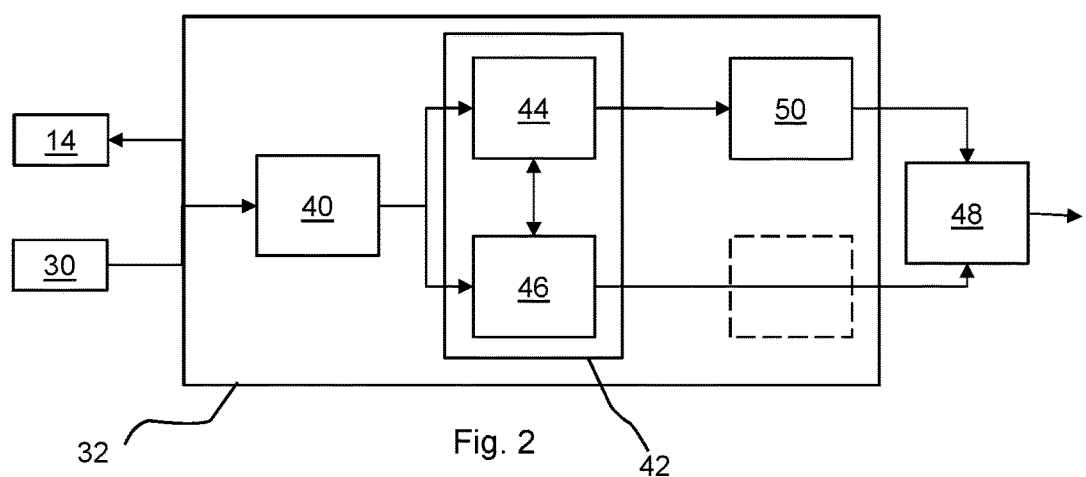

In the following, the invention is described in detail by means of an embodiment with reference to the drawing. In the drawing shows:

FIG. 1 a schematic representation of an optoelectronic device according to the inventive subject matter in use;

FIG. 2 a block diagram of essential components of the optoelectronic safety device according to the inventive subject matter.

FIG. 1 shows a safety laser scanner 12 as an example of an optoelectronic safety device 10 according to the inventive subject matter. This scanner operates according to the known light sensor mode in which a light transmitter 14 emits transmitted light beams 16 in the form of light pulses. The transmitted light beams 16 are emitted via a rotating deflection unit 18 by means of a mirror 20.

If an object 24 is in the field of view of the safety laser scanner 12, the transmitted light beams 16 are reflected by this object 24. The reflections of the transmitted light beams 16 are fed as received light beams 26 along the same optical path via the deflection unit 18 and a receiving optic 28 to a light receiver 30, where they are converted into received signals.

The received signals are fed to an evaluation unit 32 for evaluating the received signals and for outputting a safety signal at an output 34 depending on the received signals. In the evaluation unit 32, which also controls the light transmitter 14, the time of light of the transmitted light pulses is detected and from this the distance of the safety laser scanner 12 to the object 24 is determined. In addition, the rotational position of the deflection unit 18 at the time the light is emitted is detected via an encoder 19, so that overall the location of the object 24 is known from the knowledge of the deflection angle and the distance to the object 24. In this way, it can be checked whether the object 24 is located in a specific monitored area 22. In this way, the monitored area 22 is monitored to determine whether or not objects 24 are located in the monitored area 22. Depending on whether an object 24 is located in the monitored area 22, a safety signal can be output at the output 34.

The core of this invention is the structure of the evaluation unit 32 and the way of evaluation so that a safe function of the evaluation unit 32 in the sense of functional safety according to relevant safety standards can be guaranteed in a simple way.

FIG. 2 shows a simplified schematic diagram of the evaluation unit 32, which receives and evaluates the light signals from the light receiver 30 and controls the light emitter 14. The evaluation unit 32 comprises a computing unit 42 with at least two CPUs 44 and 46, besides an FPGA 40, which transmits and receives the analogue signals from the light receiver 30 and the light transmitter 14. The computing unit 42 is not a dedicated safety component, i.e. it does not comply with any relevant safety standard, and is just a standard multi-core processor 42 which is formed on a single semiconductor substrate. Such standard multi-core processors are commercially available as standard. The standard multi-core processor is preferably formed as part of a SoC (system-on-chip). The standard multi-core processor 42 evaluates the received signals forwarded by the FPGA 40 redundantly on the two CPUs 44 and 46 and, depending on the evaluation, the safety signal is routed to an I/O-unit 48. The I/O-unit 48 is connected to the output 34 at which the safety signal is then provided.

According to the inventive subject matter, the evaluation unit 32 additionally comprises a watchdog controller 50 which monitors the function of the standard multi-core processor 42, wherein the watchdog controller 50 can cause the evaluation unit 32 to output the safety signal independently of the standard multi-core processor 42. For this purpose, the watchdog controller 50 is connected on the one hand to the standard multi-core processor 42 and on the other hand to the I/O-unit 48. The watchdog controller 50 can physically be formed separately from the standard multi-core processor 42 or be a part of an SoC unit.

As shown in FIG. 2, the watchdog controller 50 forms a first logical shutdown channel with one of the CPUs, in this case the CPU 44 of the standard multi-core processor 42. The other, second logical shutdown channel is formed by the CPU 46. The watchdog controller 50 thus has two functions, namely on the one hand the function of monitoring the standard multi-core processor 42 and on the other hand, together with the CPU 44, forming a first shutdown channel being quasi-diverse to the second shutdown channel. It is also possible that the watchdog controller 50 together with the CPU 46 forms a logical shutdown channel. Preferably, the watchdog controller 50 alternately forms a shutdown channel with the CPU 44 at one time and with the CPU 46 at another time, as shown in dashed lines in FIG. 2. Communication between the CPUs 44 and 46 on the one hand and the watchdog controller 50 on the other hand takes place via a serial interface.

The watchdog controller 50 performs various tests to check the CPUs 44 and 46, which tests may include a clock frequency comparison, an activity test, generating tasks for a CPU 44 or 46 and checking corresponding task results, or monitoring voltages.

The timers of the standard multi-core processor 42 and the watchdog controller 50 are compared with each other and deviations of the timers or their oscillations can be detected.

Furthermore, the watchdog controller 50 monitors the communication with the standard multi-core processor 42 with regard to the required timing. This means that the watchdog controller 50 checks whether the safety-relevant modules connected to it are still active (alive check) and communicate correctly. Errors in the timing or other errors lead to safety-related shutdown.

The invention claimed is:

1. Optoelectronic safety device having
a light transmitter (14) for emitting transmitted light beams (16) into a monitored area (22),
a light receiver (30) for generating reception signals from received reception light beams (26) which originate from reflections of the transmitted light beams (16) on at least one object (24) in the monitored area (22),
an evaluation unit (32) for evaluating the received signals and for outputting a safety signal depending on the received signals,
wherein the evaluation unit (32) has a computing unit (42) with at least two CPUs (44, 46), wherein the computing unit (42) is not a dedicated safety module and is designed as a standard multi-core processor based on only one single semiconductor substrate and the evaluation of the signals takes place redundantly on both CPUs (44 and 46) of the computing unit (42),
and the evaluation unit (32) has a watchdog controller (50) which monitors the function of the computing unit (42), wherein the watchdog controller (50) can cause the evaluation unit (42) to output the safety signal independently of the computing unit (32).

2. Safety device according to claim 1, characterised in that the computing unit is formed as part of a SoC (system-on-chip).

3. Safety device according to claim 2, characterised in that the watchdog controller is provided external to the SoC.

4. Safety device according to claim 1, characterised in that the watchdog controller forms a second logical shutdown channel with one of the CPUs of the computing unit.

5. Safety device according to claim 4, characterised in that the watchdog controller performs various tests to check the CPUs.

6. Safety device according to claim 5, characterized in that the tests include
a watch comparison,
an activity test,
generating tasks for a CPU and checking the corresponding task results or
the monitoring of voltages.

7. Safety device according to claim 1, characterised in that the watchdog controller communicates alternately with one of the CPU of the computing unit via a serial interface.

8. Safety device according to claim 1, characterised in that the computing unit contains further CPUs.

9. Safety device according to claim 1, characterised in that a monitoring device is provided which causes the computing unit to continuously perform self-tests on individual functions.

10. Safety device according to claim 1, characterised in that it is designed as a safety laser scanner, a FMCW radar, a FMCW lidar, a 3D-ToF safety camera or a safety sensor based on sensor data fusion.

* * * * *